US009361442B2

(12) United States Patent
Dey et al.

(10) Patent No.: US 9,361,442 B2
(45) Date of Patent: Jun. 7, 2016

(54) TRIGGERING ACTIONS ON A USER DEVICE BASED ON BIOMETRICS OF NEARBY INDIVIDUALS

(71) Applicant: International Business Machines Corporation, Armonk, NY (US)

(72) Inventors: Kuntal Dey, New Delhi (IN); Hemank Lamba, New Delhi (IN); Seema Nagar, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/457,405

(22) Filed: Aug. 12, 2014

(65) Prior Publication Data

US 2016/0048666 A1 Feb. 18, 2016

(51) Int. Cl.
*H04L 29/06* (2006.01)
*G06F 21/32* (2013.01)
*G06F 17/30* (2006.01)

(52) U.S. Cl.
CPC .......... *G06F 21/32* (2013.01); *G06F 17/30477* (2013.01)

(58) Field of Classification Search
CPC ..... G06F 21/10; G06F 21/31; G06F 21/6218; G06F 2221/2141; G06F 21/32; H04L 63/102
See application file for complete search history.

(56) References Cited

U.S. PATENT DOCUMENTS

| 6,572,014 | B1 | 6/2003 | Lambert | |
|---|---|---|---|---|
| 8,271,420 | B2 * | 9/2012 | Everhart | G09B 7/02 706/49 |
| 8,355,951 | B1 * | 1/2013 | Daniel | G06F 21/10 348/135 |
| 2010/0325218 | A1 | 12/2010 | Castro et al. | |
| 2011/0279228 | A1 * | 11/2011 | Kumar | G09B 7/00 340/5.83 |
| 2013/0051632 | A1 * | 2/2013 | Tsai | G06K 9/00892 382/118 |
| 2013/0095805 | A1 | 4/2013 | LeBeau et al. | |
| 2014/0266669 | A1 * | 9/2014 | Fadell | G05B 19/042 340/501 |

* cited by examiner

*Primary Examiner* — Chau Le
*Assistant Examiner* — Ghodrat Jamshidi
(74) *Attorney, Agent, or Firm* — Ryan, Mason & Lewis, LLP (57) ABSTRACT

Methods, systems, and computer program products for automatically triggering actions on a user device based on biometrics of nearby individuals are provided herein. A method includes capturing, via one or more sensors resident on a first computing device, one or more items of biometric information from one or more individuals located within a given proximity of the first computing device; determining a degree of proximity of the one or more individuals to the first computing device; transmitting, to a second computing device, (i) the one or more captured items of biometric information from the one or more individuals and (ii) the determined degree of proximity of the one or more individuals to the first computing device; and automatically executing one or more actions on the first computing device based on an instruction provided by the second computing device in response to said transmitting.

19 Claims, 4 Drawing Sheets

TRIGGERING ACTIONS ON A USER DEVICE BASED ON BIOMETRICS OF NEARBY INDIVIDUALS

FIELD OF THE INVENTION

Embodiments of the invention generally relate to information technology, and, more particularly, to biometric technology.

BACKGROUND

Biometric-based identification processes, in existing approaches, include the use of elements such as fingerprints, eyeball scans, facial and/or voice-based recognition. However, existing approaches cannot carry out actions automatically by acting upon inferences based upon biometrically detected social conditions.

Accordingly, a need exists for techniques for automatically triggering actions on a user device based on biometrics of nearby individuals.

SUMMARY

In one aspect of the present invention, techniques for automatically triggering actions on a user device based on biometrics of nearby individuals are provided. An exemplary computer-implemented method can include steps of capturing, via one or more sensors resident on a first computing device, one or more items of biometric information from one or more individuals located within a given proximity of the first computing device; determining a degree of proximity of the one or more individuals to the first computing device; transmitting, to a second computing device, (i) the one or more captured items of biometric information from the one or more individuals and (ii) the determined degree of proximity of the one or more individuals to the first computing device; and automatically executing one or more actions on the first computing device based on an instruction provided by the second computing device in response to said transmitting.

In another aspect of the invention, an exemplary computer-implemented method can include steps of processing a transmission from a first computing device, wherein said transmission comprises (i) one or more items of biometric information captured from one or more individuals located within a given proximity of the first computing device and (ii) a determined degree of proximity of the one or more individuals to the first computing device; determining a relationship status between a user associated with the first computing device and each of the one or more individuals based on the one or more items of biometric information captured from the one or more individuals; determining a set of one or more actions to be automatically executed by the first computing device based on (i) the determined relationship status between the user associated with the first computing device and each of the one or more individuals and (ii) the determined degree of proximity of the one or more individuals to the first computing device; and transmitting an instruction to the first computing device, wherein the instruction comprises the set of one or more actions.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As described herein, an aspect of the present invention includes social- and biometric-based event auto-triggering. Accordingly, at least one embodiment of the invention includes automatically triggering actions on a user device based on biometrics of nearby individuals. Specifically, an aspect of the invention includes capturing biometric information such as voice, image, fingerprints, eyeball detection and/or iris detection of individuals within a given proximity to a user device in a non-intrusive manner, and computing a degree of proximity of the individuals to a social circle of the user of the user device.

Additionally, at least one embodiment of the invention includes identifying a set of actions to be performed by the user device based on the biometric data and the proximity data. By way of example, the set of actions can be identified via a separate device (for example, a back-end device) which learns the set of actions based on the user's past actions and/or operates based on one or more specified rules based on information stored in a database. Additionally, for example, the set of actions can be identified based on current access of an object, such as a set of running processes, content, a content type, a content source on each tab, etc. At least one embodiment of the invention further includes executing one or more actions from the set of actions via the user device and collecting manual actions of the corresponding user to provide learning for an observed biometric condition.

One or more embodiments of the invention include a back-end (for example, offline) aspect to extract the nature and strength of social relationships of a user with other individuals, using internal and other supplied and/or specified data sources. In an example embodiment of the invention, some of the extracted relationships are cached in a front-end device (for example, a user device) for efficient execution. By way of example, the back-end device can include a standard computing device, such as a server, and the front-end device can include a mobile phone, a laptop, a tablet, a wearable device such as a watch, etc. As detailed further herein, certain functions are preferably carried out by a back-end device, while certain other functions are preferably carried out by a front-end device. For example, determining social relationships is preferably carried out by a back-end device, as (a) the back-end device will ensure that items of data do not reach the potentially less-secure front-end device, (b) the computing power of a typical back-end is leveraged, and (c) privacy is maintained for all users to the best extent possible. The optional caching of such social relationships can be carried out by the front-end device for increased speed and ease of use.

Additionally, another aspect of the invention includes a technique carried out via the corresponding front-end device that captures biometric information (such as voice data, fingerprints, eyeball scans, face imaging data, etc.) and storing such information locally on the device. Such capturing can be carried out across, by way of example, all of the individuals detected by the device within a given proximity of the device. Additionally, in at least one embodiment of the invention, the capturing step includes determining the degree of estimated proximity of the detected individuals (for example, touching the device indicates a close proximity, speech or face recognition indicates that a detected individual is farther away, or a voice token received on the phone can be treated with a specific weight of proximity). Further, such an embodiment includes transferring the biometric and the proximity information to the back-end device, which can include a database to store biometric information of individuals and identify individuals associated with given biometric information.

At least one embodiment of the invention also includes a technique implemented on the front-end device to send a lightweight image of the current state of the individual (that is, the user associated with the front-end device), for a set of registered state objects, to the back-end device. As detailed herein, the set of registered state objects can include, for example, running processes, the content, content type and content source of each tab on the browser, etc.

Further, such an embodiment of the invention can include a technique implemented by the back-end device that intelligently decides the set of one or more actions to be carried out on some or all of the objects, based upon (a) rules specified and/or (b) learning obtained from observed behavior of the user of the front-end device. Accordingly, the back-end device subsequently transfers the set of decided actions to the front-end device. By way of example, such actions might include an automated search action, a browser window opening and/or minimizing, generation of a notification, etc.

Additionally, in at least one embodiment of the invention, the front-end device can be configured to listen to and/or process the back-end device instructions, transferred in the form of action set, and take appropriate actions by executing an appropriate system or appropriate software commands. Also, as described herein, such an embodiment can further include implementing techniques to collect and/or process manual actions at the front-end device, and sending the identification of such manual actions to the back-end device for use in learning a user's behavioral pattern under observed biometric conditions.

Also, the user can set an execution list and a rule to trigger the items in the execution list whenever a given individual (a fellow employee, for example) is detected as approaching the user's workstation. For example, the user may have added a presentation document and a Java code that he wishes to share with the given individual. Additionally, this example embodiment of the invention includes having learned, over time, that whenever the user and the given individual are speaking, the user often browses an intranet site of the company. Accordingly, upon detecting the given individual approaching, the above-noted presentation document can be automatically opened along with a Java programming platform with the appropriate workspace loaded. Further, a browser tab can also be automatically opened to the company intranet home page or a list of company intranet sites that the user has stored in a bookmarks list.

By way of additional illustration, consider the following example scenario and implementation of an embodiment of the invention. For instance, a user is walking in a crowded marketplace, and the user's device (for example, a smartphone) detects or "hears" a group of her friends talking close by (and the user did not know, for example, that the friends were expected to be there at that time). Such an example embodiment of the invention, operating on the user's device, can include generating an alert or an automated phone call and/or text message that is output to the user, indicating to the user that the device has heard and/or detected the friends. Further, some or all of the detected friends can be sent a message (to the friends' corresponding devices) from the user's device stating that the user is nearby (and also providing the user's location).

By way of yet further illustration, consider the following example scenario and implementation of an embodiment of the invention. For instance, a given user permits the unlocking of a personal application (app) to his friends, as long as the total trust in the set of friends is sufficiently high. The given user, Hemank, has two friends, Kuntal (friendship strength 0.7) and Seema (friendship strength 0.9). Hemank also has another friend, James, with whom he has a friendship strength of 0.3. In such an example embodiment of the invention, the strength values are externally provided, for example, by a third-party social network analyses toolkit.

Additionally, Hemank's known threshold (as identified per his set rules, his feedback, and/or via a learning mechanism) indicates that Hemank permits additional trust to friends beyond the total friendship strength of 0.8 mark, as long as there is at least one friend beyond the 0.5 friendship strength mark and at least another friend beyond the 0.2 friendship mark. Moreover, Hemank's phone has a touch screen capable of detecting live fingers and fingerprints. Accordingly, consider the following situations in connection with this example embodiment of the invention.

In a first example situation, Kuntal and Seema both touch the locked app on the screen of Hemank's phone (for example, within a predetermined finite period of time), and therefore the system unlocks the personal app (total friendship strength=0.7+0.9=1.6, which is greater than 0.8). In a second example situation, Kuntal alone touches the locked app on the screen of Hemank's phone, but the app does not unlock (0.7<0.8). If Seema alone touches the locked app on the screen of Hemank's phone, the app would unlock (0.9>0.8). In a third example situation, Kuntal and James both touch the locked app on the screen of Hemank's phone, and the app unlocks (0.7+0.3=1 (which is >0.8), while 0.7>0.5 and 0.3>0.2).

By way of additional illustration, consider the following example scenario and implementation of an embodiment of the invention. For instance, Kuntal is streaming a television show on his smart device when Hemank and Seema come and join him. Incorporating one or more aspects of the invention, Kuntal's smart device recognizes, for example, via face recognition and/or eye detection, Hemank and Seema, and also identifies a friendship that Kuntal has with both Hemank and Seema, and a mutual friendship that Hemank and Seema share.

Further, in this example scenario, one or more embodiments of the invention include displaying, via Kuntal's smart device during an upcoming advertisement break in the streaming television show, one or more advertisements that match the group profile of Seema, Hemank and Kuntal. Also, group offers that are expected to appeal to Kuntal, Hemank and Seema can be prioritized.

By way of further illustration, consider the following example scenario and implementation of an embodiment of the invention. For instance, Kuntal's device (for example, a laptop) detects that Kuntal is talking about restaurants, and the device also detects (or "hears") Seema and Hemank respond to Kuntal, indicating their willingness to have lunch in a nearby restaurant. Consequently, in accordance with an example embodiment of the invention, an automatic search action is triggered on Kuntal's device (for example, by opening a new web browser tab), with parameters based upon the combined cuisine and location preference of Kuntal, Seema and Hemank, and/or other implicit parameters.

Figure 1:
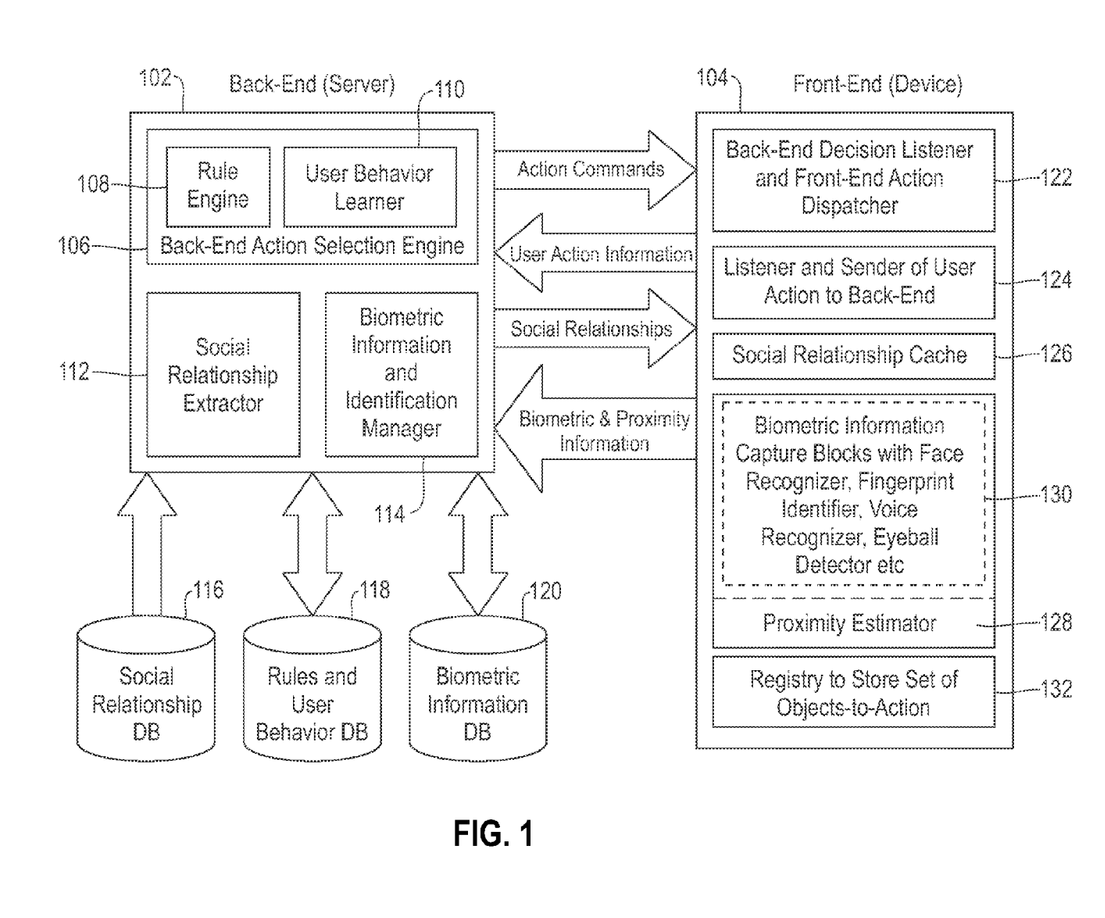
FIG. 1 is a block diagram illustrating an example embodiment, according to an aspect of the invention.

FIG. 1 is a block diagram illustrating an example embodiment, according to an aspect of the invention. By way of illustration, FIG. 1 depicts a back-end device or server 102 and a front-end device 104. As described further herein, the front-end device 104 provides the back-end server 102 with user action information as well as biometric and relationship information pertaining to one or more individuals. Also, the back-end server 102 provides the front-end device 104 with action commands and an identification of one or more social relationship among users and/or individuals.

The back-end server 102 interacts with a social relationship database (DB) 116, a rules and user behavior database 118 and a biometric information database 120. Additionally, the back-end server 102 includes a back-end action selection engine 106, which includes a rule engine component 108 and a user behavior learning component 110. Further, as depicted in FIG. 1, the back-end server 102 includes a social relationship extractor component 112 and a biometric information and identification manager component 114.

The front-end device 104 includes a back-end decision listener and front-end action dispatcher component 122. Additionally, the front-end device 104 includes a listener and sender of user action (to the back-end device) component 124 as well as a social relationship cache 126. Further, as also illustrated in FIG. 1, the front-end device 104 includes a registry 132 to store sets of objects-to-action and a proximity estimator 128, which includes a biometric information capture component 130, which can include capabilities such as facial recognition, fingerprint identification, voice recognition, eyeball detection, etc.

By way of further illustration, the proximity estimator 128 uses the output of the biometric information capture component 130, and sends that output to the back-end device 102. Further, the listener component 124 takes the responsibility of listening to and sending identifications of the user actions to the back-end device 102. The information transmitted by the proximity estimator 128 is used by the biometric information and identification manager component 114 to identify the individuals detected near and/or around the front-end device 104. The social relationship extractor component 112 is used to determine the nature and/or level of the social relationship among the individuals identified by the biometric information and identification manager component 114.

Additionally, the back-end action selection engine 106 is an engine that selects the one or more user actions that are to be automated at the front-end device 104 by way of an instruction transmitted from the back-end device 102 to the front-end device 104. The back-end action selection engine 106, as noted above, includes two sub-components: the rule engine 108 and the user behavior learner component 110. Using the information made available by components 114 and 112, the back-end action selection engine 106 uses the rule engine 108 and the user behavior learner component 110 to determine the relevant actions and send such a determination to the front-end device 104 (which captures the sent determination via component 122). The back-end decision listener and front-end action dispatcher component 122, in turn, dispatches the action items by dereferencing the registry entries stored at component 132, thereby leading to actions being taken and/or carried out by the front-end device 104.

Figure 2:
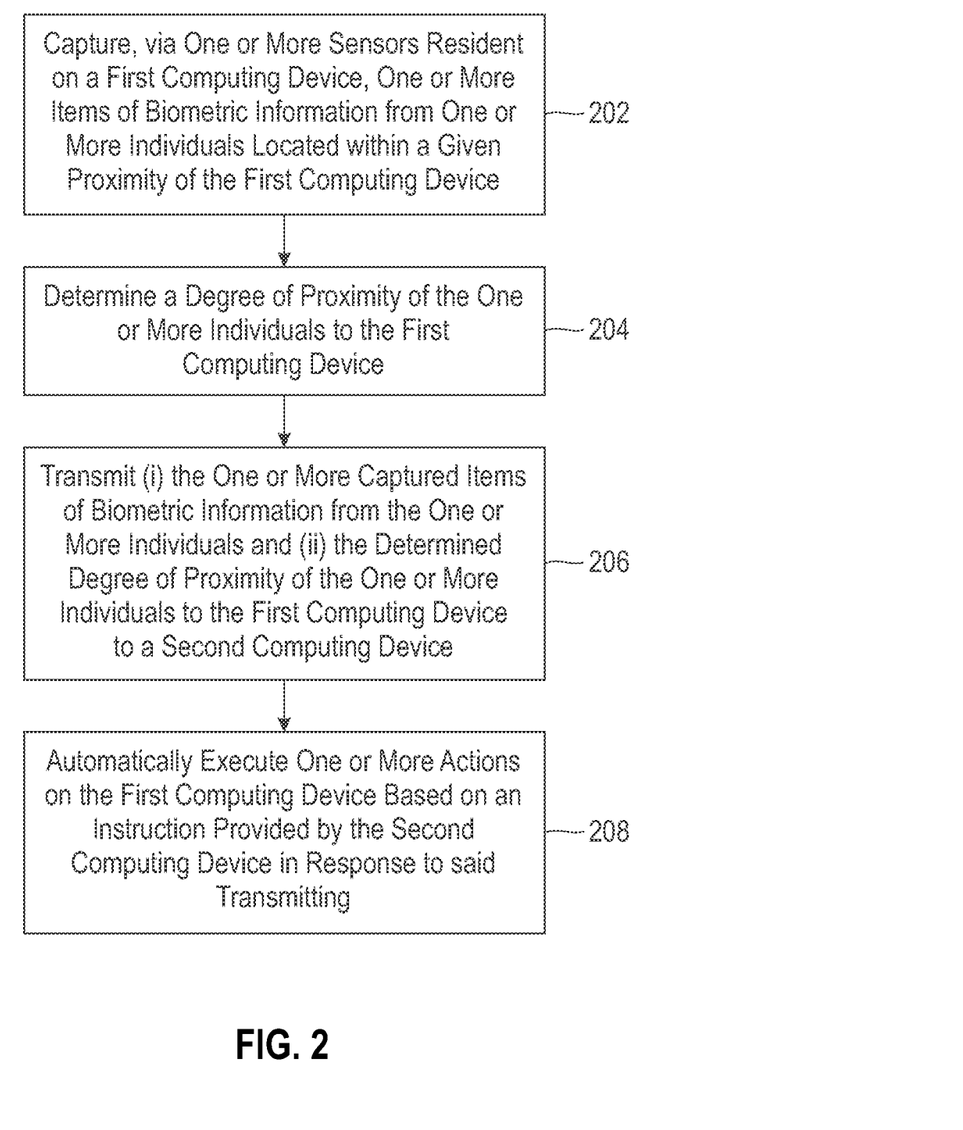
FIG. 2 is a flow diagram illustrating techniques according to an embodiment of the invention.

FIG. 2 is a flow diagram illustrating techniques according to an embodiment of the present invention. Step 202 includes capturing, via one or more sensors resident on a first computing device, one or more items of biometric information (for example, voice recognition, fingerprint identification, eyeball identification, and/or facial recognition) from one or more individuals located within a given proximity of the first computing device.

Step 204 includes determining a degree of proximity of the one or more individuals to the first computing device. Step 206 includes transmitting, to a second computing device, (i) the one or more captured items of biometric information from the one or more individuals and (ii) the determined degree of proximity of the one or more individuals to the first computing device.

Step 208 includes automatically executing one or more actions on the first computing device based on an instruction provided by the second computing device in response to said transmitting. Automatically executing the one or more actions can include, for example, executing a system on the first computing device corresponding to the instruction provided by the second computing device and/or executing a software command on the first computing device corresponding to the instruction provided by the second computing device.

The techniques depicted in FIG. 2 can also include detecting the one or more individuals located within the given proximity of the first computing device. Further, at least one embodiment of the invention includes determining whether to capture one or more items of biometric information from the one or more individuals located within the given proximity of the first computing device based on one or more parameters. Considerations in such a determination can include, for example, whether an individual's voice is sufficiently loud to be worthy of capture, or whether an individual is looking for a sufficiently long period of time towards a sensor of the first computing device (a screen, for instance) to be worthy of facial and/or eyeball capture/recognition.

Additionally, the techniques depicted in FIG. 2 can include generating an assessment of the current state of a pre-determined set of one or more state objects associated with the first computing device. The pre-determined set of one or more state objects can include, for example, (i) a set of running processes on the first computing device, (ii) content opened for viewing on the first computing device, (iii) content opened for operating on the first computing device, (iv) a content type of each tab on a web browser of the first computing device, and/or (v) a content source of each tab on a web browser on the first computing device. Further, at least one embodiment of the invention can include transmitting the assessment of the current state of the pre-determined set of one or more state objects associated with the first computing device to the second computing device.

The techniques depicted in FIG. 2 can also include processing the instruction provided by the second computing device in response to said transmitting to determine the one or more actions to be executed on the first computing device.

Additionally, one or more embodiments of the invention can include identifying one or more manual actions carried out by a user on the first computing device, as well as transmitting the one or more identified manual actions to the second computing device.

Further, at least one embodiment of the invention can include storing, locally on the first computing device, information pertaining to a relationship between a user associated with the first computing device and at least one of the one or more individuals. The relationship can be based on a likelihood of the at least one individual being located within the given proximity of the first computing device. Additionally, the relationship can be based on a frequency of an action executed on the first computing device given the at least one individual being located within the given proximity of the first computing device.

Figure 3:
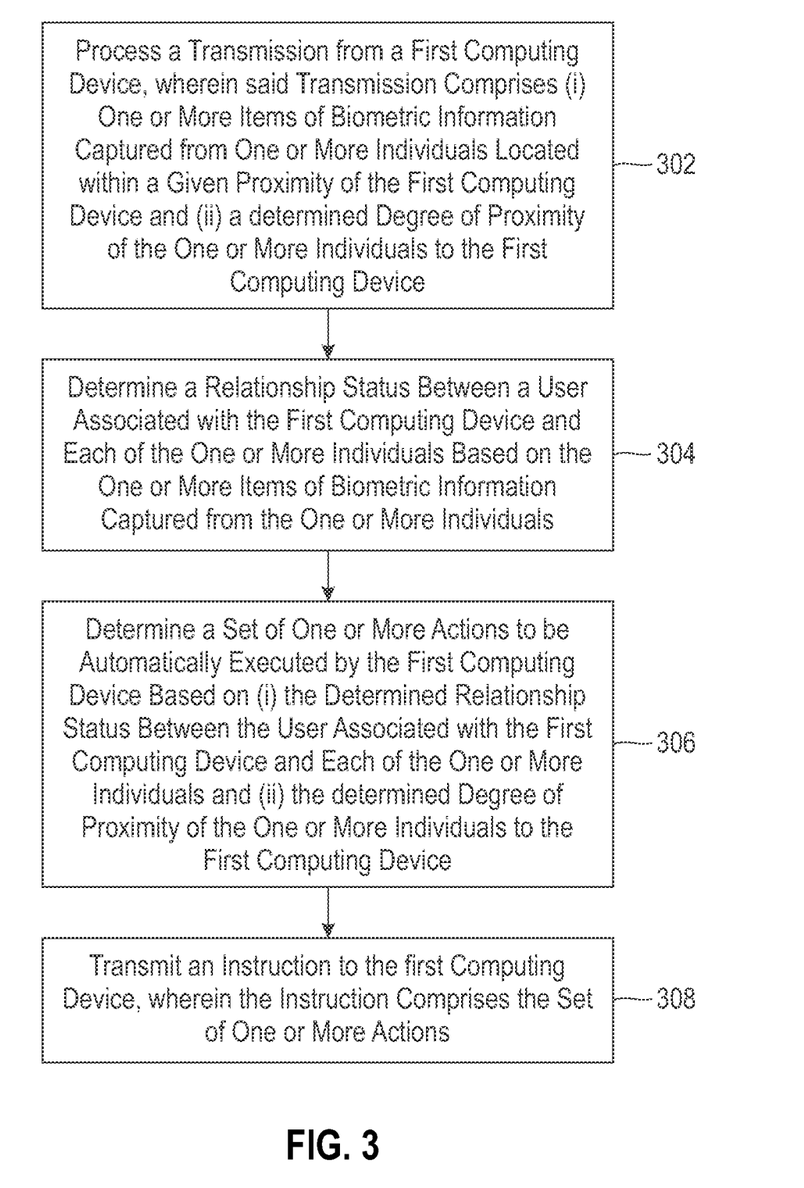
FIG. 3 is a flow diagram illustrating techniques according to an embodiment of the invention.

FIG. 3 is a flow diagram illustrating techniques according to an embodiment of the invention. Step 302 includes processing a transmission from a first computing device, wherein said transmission comprises (i) one or more items of biometric information captured from one or more individuals located within a given proximity of the first computing device and (ii) a determined degree of proximity of the one or more individuals to the first computing device.

Step 304 includes determining a relationship status between a user associated with the first computing device and each of the one or more individuals based on the one or more items of biometric information captured from the one or more individuals. Determining the relationship status can include, for example, using information from one or more external data sources.

Step 306 includes determining a set of one or more actions to be automatically executed by the first computing device based on (i) the determined relationship status between the user associated with the first computing device and each of the one or more individuals and (ii) the determined degree of proximity of the one or more individuals to the first computing device. Determining the set of one or more actions can be further based on past behavior of the user associated with the first computing device.

Step 308 includes transmitting an instruction to the first computing device, wherein the instruction comprises the set of one or more actions.

The techniques depicted in FIG. 2 and FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 2 and FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

An aspect of the invention or elements thereof can be implemented in the form of an apparatus including a memory and at least one processor that is coupled to the memory and configured to perform exemplary method steps.

Figure 4:
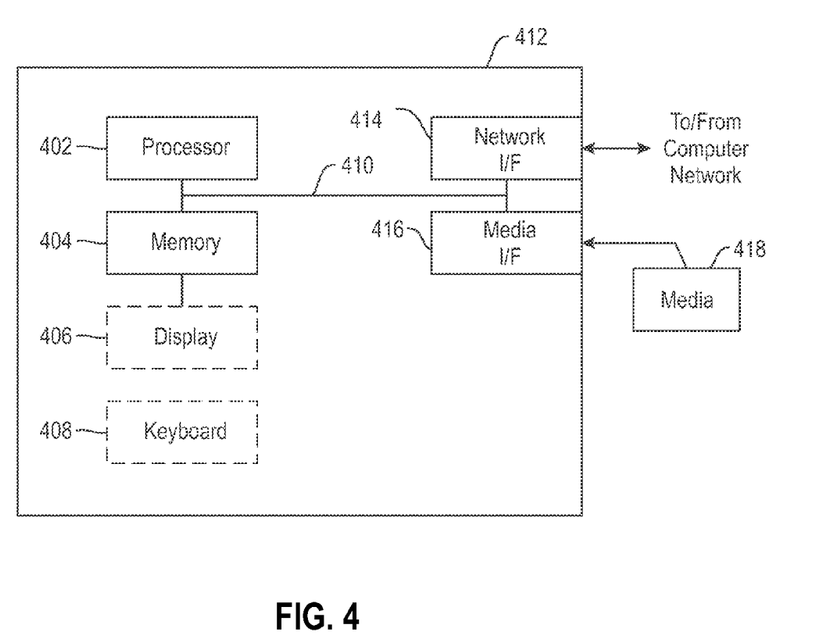
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As will be appreciated by one skilled in the art, aspects of the present invention may be embodied as a system, method and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, as noted herein, aspects of the present invention may take the form of a computer program product that may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof.

The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, automatically triggering one or more specified actions based upon biometrically-detected conditions of the contemporary social circle of an individual.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
capturing, via one or more sensors resident on a first of multiple user computing devices of multiple users associated with a predetermined group, one or more items of biometric information from one or more individuals located within a given proximity of one or more of the multiple computing devices;
determining a degree of proximity of the one or more individuals to one or more of the multiple user computing devices of the multiple users associated with said predetermined group;
transmitting, to a computing device distinct from the predetermined group, (i) the one or more captured items of biometric information from the one or more individuals and (ii) the determined degree of proximity of the one or more individuals to the one or more of the multiple user computing devices of the multiple users associated with said predetermined group; and
automatically executing one or more distinct actions on each of the multiple user computing devices of the multiple users associated with said predetermined group based on an instruction provided by the computing device distinct from the predetermined group in response to said transmitting, wherein said instruction is based on (i) past behavior of each of the multiple users associated with said predetermined group and (ii) a relationship status between each of the multiple users associated with said predetermined group and each of the one or more individuals.

2. The method of claim 1, wherein said one or more items of biometric information comprise at least one of voice recognition, fingerprint identification, eyeball identification, and facial recognition.

3. The method of claim 1, wherein said automatically executing comprises executing a system on each of the multiple user computing devices corresponding to the instruction provided by the computing device distinct from the predetermined group.

4. The method of claim 1, wherein said automatically executing comprises executing a software command on each of the multiple user computing devices corresponding to the instruction provided by the computing device distinct from the predetermined group.

5. The method of claim 1, comprising:
detecting the one or more individuals located within the given proximity of the one or more of the multiple user computing devices.

6. The method of claim 1, comprising:
determining whether to capture said one or more items of biometric information from the one or more individuals located within the given proximity of the one or more of the multiple user computing devices based on one or more parameters.

7. The method of claim 1, comprising:
generating an assessment of the current state of a pre-determined set of one or more state objects associated with each of the multiple user computing devices.

8. The method of claim 7, wherein said pre-determined set of one or more state objects comprises at least one of (i) a set of running processes on each of the multiple user computing devices, (ii) content opened for viewing on each of the multiple user computing devices, (iii) content opened for operating on each of the multiple user computing devices, (iv) a content type of each tab on a web browser of each of the multiple user computing devices, and (v) a content source of each tab on a web browser on each of the multiple user computing devices.

9. The method of claim 7, comprising:
transmitting the assessment of the current state of the pre-determined set of one or more state objects associated with each of the multiple user computing devices to the computing device distinct from the predetermined group.

10. The method of claim 1, comprising:
processing the instruction provided by the computing device distinct from the predetermined group in response to said transmitting to determine the one or more actions to be executed on each of the multiple user computing devices.

11. The method of claim 1, comprising:
identifying one or more manual actions carried out by a user on each of the multiple user computing devices.

12. The method of claim 11, comprising:
transmitting the one or more identified manual actions to the computing device distinct from the predetermined group.

13. The method of claim 1, comprising:
storing, locally on each of the multiple user computing devices, information pertaining to a relationship between a user associated with each of the multiple user computing devices and at least one of the one or more individuals.

14. The method of claim 13, wherein said relationship is based on the likelihood of the at least one individual being located within the given proximity of the one or more of the multiple user computing devices.

15. The method of claim 13, wherein said relationship is based on a frequency of an action executed on each of the multiple user computing devices given the at least one individual being located within the given proximity of the one or more of the multiple user computing devices.

16. A computer program product, the computer program product comprising a computer readable storage medium having program instructions embodied therewith, the program instructions executable by a computing device to cause the computing device to:
capture, via one or more sensors resident on a first of multiple user computing devices of multiple users associated with a predetermined group, one or more items of biometric information from one or more individuals located within a given proximity of one or more of the multiple computing devices;
determine a degree of proximity of the one or more individuals to one or more of the multiple user computing devices of the multiple users associated with said predetermined group;
transmit, to a computing device distinct from the predetermined group, (i) the one or more captured items of biometric information from the one or more individuals and (ii) the determined degree of proximity of the one or more individuals to the one or more of the multiple user computing devices of the multiple users associated with said predetermined group; and
automatically execute one or more distinct actions on each of the multiple user computing devices of the multiple users associated with said predetermined group based on an instruction provided by the computing device distinct from the predetermined group in response to said transmitting, wherein said instruction is based on (i) past behavior of each of the multiple users associated with said predetermined group and (ii) a relationship status between each of the multiple users associated with said predetermined group and each of the one or more individuals.

17. A system comprising:
a memory; and
at least one processor coupled to the memory and configured for:
capturing, via one or more sensors resident on a first of multiple user computing devices of multiple users associated with a predetermined group, one or more items of biometric information from one or more individuals located within a given proximity of one or more of the multiple computing devices;
determining a degree of proximity of the one or more individuals to one or more of the multiple user computing devices of the multiple users associated with said predetermined group;
transmitting, to a computing device distinct from the predetermined group, (i) the one or more captured items of biometric information from the one or more individuals and (ii) the determined degree of proximity of the one or more individuals to the one or more of the multiple user computing devices of the multiple users associated with said predetermined group; and
automatically executing one or more distinct actions on each of the multiple user computing devices of the multiple users associated with said predetermined group based on an instruction provided by the computing device distinct from the predetermined group in response to said transmitting, wherein said instruction is based on (i) past behavior of each of the multiple users associated with said predetermined group and (ii) a relationship status between each of the multiple users associated with said predetermined group and each of the one or more individuals.

18. A method comprising:
processing a transmission from a first of multiple user computing devices of multiple users associated with a predetermined group, wherein said transmission comprises (i) one or more items of biometric information captured from one or more individuals located within a given proximity of one or more of the multiple user computing devices and (ii) a determined degree of proximity of the one or more individuals to the one or more of the multiple user computing devices;
determining a relationship status between each of the multiple users associated with said predetermined group and each of the one or more individuals based on the one or more items of biometric information captured from the one or more individuals;
determining a set of one or more distinct actions to be automatically executed by each of the multiple user computing devices based on (i) the determined relationship status between each of the multiple users associated with said predetermined group and each of the one or more individuals, (ii) the determined degree of proximity of the one or more individuals to one or more of the multiple user computing devices of the multiple users associated with said predetermined group, and (iii) past behavior of each of the multiple users associated with said predetermined group; and
transmitting an instruction to each of the multiple user computing devices of the multiple users associated with said predetermined group, wherein the instruction comprises the set of one or more distinct actions to be automatically executed by each of the multiple user computing devices.

19. The method of claim 18, wherein said determining the relationship status comprises using information from one or more external data sources.

* * * * *